United States Patent
Lehomme et al.

(10) Patent No.: US 9,283,849 B2
(45) Date of Patent: Mar. 15, 2016

(54) OPERATION EQUIPMENT FOR A VEHICLE

(76) Inventors: Francis Lehomme, Avernes (FR);
Frank Schliep, Leverkusen (DE)

( * ) Notice: Subject to any disclaimer, the term of this patent is extended or adjusted under 35 U.S.C. 154(b) by 984 days.

(21) Appl. No.: 12/524,551

(22) PCT Filed: Jan. 29, 2008

(86) PCT No.: PCT/EP2008/000677
§ 371 (c)(1),
(2), (4) Date: Dec. 21, 2009

(87) PCT Pub. No.: WO2008/092637
PCT Pub. Date: Aug. 7, 2008

(65) Prior Publication Data
US 2010/0106366 A1    Apr. 29, 2010

(30) Foreign Application Priority Data

Jan. 29, 2007 (DE) .......................... 10 2007 005 199
Jan. 31, 2007 (DE) .......................... 10 2007 005 741

(51) Int. Cl.
| | | |
|---|---|---|
| *G06F 7/00* | (2006.01) | |
| *B60K 37/06* | (2006.01) | |
| *B60K 35/00* | (2006.01) | |
| *B60K 37/00* | (2006.01) | |

(52) U.S. Cl.
CPC ............. *B60K 37/06* (2013.01); *B60K 35/00* (2013.01); *B60K 37/00* (2013.01); *B60K 2350/1012* (2013.01); *B60K 2350/1024* (2013.01); *B60K 2350/1028* (2013.01); *B60K 2350/901* (2013.01); *B60K 2350/903* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,552,550 | B2 * | 4/2003 | Karray et al. ................. | 324/662 |
| 6,693,442 | B2 * | 2/2004 | Karray ............. | B60R 21/01538 |
| | | | | 324/662 |
| 7,656,169 | B2 * | 2/2010 | Scheckenbach .. | B60R 21/01532 |
| | | | | 280/735 |
| 7,670,016 | B2 * | 3/2010 | Weller ...................... | B60R 1/12 |
| | | | | 340/425.5 |
| 7,756,611 | B2 * | 7/2010 | Sugiura .................. | B60K 35/00 |
| | | | | 280/735 |
| 7,782,299 | B2 * | 8/2010 | Ogino ..................... | G06F 3/011 |
| | | | | 345/158 |
| 2002/0125050 | A1 * | 9/2002 | Breed et al. ................... | 177/136 |
| 2003/0227375 | A1 * | 12/2003 | Yong ..................... | B60Q 1/503 |
| | | | | 340/425.5 |
| 2006/0028453 | A1 * | 2/2006 | Kawabe ............. | H04N 13/0404 |
| | | | | 345/173 |
| 2006/0187038 | A1 * | 8/2006 | Shieh ........................ | G01B 7/14 |
| | | | | 340/562 |
| 2006/0261672 | A1 * | 11/2006 | Richter ............... | B60R 25/2027 |
| | | | | 307/10.1 |

(Continued)

FOREIGN PATENT DOCUMENTS

| | | |
|---|---|---|
| DE | 103 05 341 A1 | 8/2004 |
| DE | 102005035111 A1 | 9/2006 |

(Continued)

OTHER PUBLICATIONS
Japanese Office Action dated Aug. 7, 2012.

*Primary Examiner* — Jonathan L Sample
(74) *Attorney, Agent, or Firm* — Fletcher Yoder, P.C.

(57) ABSTRACT

Operation equipment for a vehicle includes a control element, an actuator device, and an electronic control unit. A sensor distinguishes an origin of a control action applied to the control element. The control element is operated in a contactless manner. The sensor may use signal transmission through a human body. The origins distinguished may include a driver seat and a passenger seat.

8 Claims, 1 Drawing Sheet

(56) References Cited

U.S. PATENT DOCUMENTS

| | | | | |
|---|---|---|---|---|
| 2006/0279528 | A1* | 12/2006 | Schobben | B60K 35/00 345/156 |
| 2007/0132559 | A1* | 6/2007 | Schleeh | B60R 21/01532 340/425.5 |
| 2007/0146343 | A1* | 6/2007 | Prados | G06F 3/016 345/173 |
| 2007/0265745 | A1* | 11/2007 | Styles | B60H 1/00985 701/36 |
| 2007/0289799 | A1* | 12/2007 | Aoki | B60N 2/002 180/271 |
| 2007/0297064 | A1* | 12/2007 | Watanabe | B60K 35/00 359/630 |
| 2008/0052254 | A1* | 2/2008 | Al Amri | G06Q 30/0284 705/418 |
| 2010/0106366 | A1* | 4/2010 | Lehomme | B60K 35/00 701/36 |
| 2012/0326958 | A1* | 12/2012 | Deuel | G06F 3/0421 345/156 |
| 2014/0184577 | A1* | 7/2014 | Kim | G09G 5/10 345/207 |

FOREIGN PATENT DOCUMENTS

| | | |
|---|---|---|
| DE | 102005015802 A1 | 10/2006 |
| DE | 10 2007 011 543 A1 | 3/2008 |
| JP | 2005-070224 | 3/2005 |
| JP | 2006522397 | 9/2006 |
| WO | 2004/078536 A2 | 9/2004 |

\* cited by examiner

OPERATION EQUIPMENT FOR A VEHICLE

CROSS REFERENCE TO RELATED APPLICATIONS

This application claims priority from and the benefit of PCT Application No. PCT/EP2008/000677, filed on Jan. 29, 2008; German Patent No. DE 10 2007 005 199.0, filed on Jan. 29, 2007; and German Patent DE 10 2007 005 741.7, filed on Jan. 31, 2007; all entitled "Operation Equipment for a Vehicle", which are herein incorporated by reference.

BACKGROUND

The present invention is related to an operation equipment for the provision of an operation interface inside a vehicle wherein the operation equipment is provided to be used by a multitude of vehicle occupants.

Usually such operation equipment or control elements are provided centrally in the vehicle, e.g. in the area of the center console and hence can be operated by more than one vehicle occupant, e.g. both by the driver and by the passenger. This is unproblematic if the function or the actuation to be caused when operating the control elements are intended for all occupants of the vehicle similarly, e.g. the activation of an interior lighting or passenger compartment illumination located in the headlining and providing an overall illumination of the vehicle interior.

However, there are cases where the actuation to be caused when operating one and the same control element is different, dependent on the origin of the control action applied to the control element, i.e. dependent for example whether the driver is the origin of the control action or whether the passenger is the origin of the control action. As one example, dual view display are mentioned—e.g. disclosed in German patent application DE 10 2005 035 111 A1—that can display different information contents dependent from the direction of view, e.g. simultaneously navigational information for the driver and video information for the passenger. In such a case both occupants of the vehicle have different needs for operating control elements. However, the known devices have especially the drawback to require the touching of a surface of a control element, e.g. by a finger of the vehicle occupant.

It was therefore an object of the present invention to further improve vehicle control elements, such that touching can be avoided and/or to further improve the sensing of the origin of a control action applied to control elements.

SUMMARY

The problem is solved with regard to a first embodiment of the present invention by an operation equipment for a vehicle comprising a control element, an actuator device and an electronic control unit, the operation equipment further comprising a distinction sensor for distinguishing the origin of a control action applied to the control element, wherein the control element is operated in a contactless manner. This provides the possibility to operate a control element without a physical contact or a strike, e.g. of a finger of the vehicle occupant. It is only necessary that e.g. a finger approaches the control element. This leads to the possibility to improve not only the hygienic performance of control elements—especially in vehicles that are used by a multitude of different persons at different times such as rental cars or the like—but also the esthetical performance of the surface of such control elements because traces of fingerprints are not left on the surface of such control elements. The provision of a control element that is possible to use in a contactless manner is particularly advantageous in the case of a control element integrated together with a display device (especially a display device providing a dual-view functionality, i.e. providing a first video image within a first angular range and a second video image within a second angular range). Such a realization of the present invention allows for an operation of the control element by means of movements of a hand or of a finger in front of the surface of the display device (but without the necessity of a contact between the operating person and the surface of the display device). Preferably, such movements or gestures include movements having components parallel to the surface of the display device or orthogonal to the surface of the display device, e.g. linear movements approximately in the one or in the other of the directions of a plane parallel to the display device, circular movements in a plane parallel to the display device, approaching movements towards the display device (i.e. a movement orthogonal to the surface of the display device) or the like. In order to detect such movements, the influence of the finger or the hand of an operating person on electromagnetic AC fields and/or DC fields can be detected. According to the present invention, this can be realized in a preferred embodiment by means of a segmented sensor device of the distinction sensor, the segmented sensor device being located for example on the back side of the display device such that the movements or gestures of a finger or the hand of an operating person can be detected and traces of fingerprints be avoided on the surface of the control element and especially on the surface of the display device. Another advantage of a contactless manner of operating the control element lies in the fact that a plurality of operating actions can be performed by a plurality of vehicle occupants and recognized simultaneously by the inventive operation equipment. This is possible by means of spatially arrange the movements of a plurality of vehicle occupants in an echelon and thereby sharing the same surface area or surface part of the display device. The distinction between the plurality of vehicle occupants is possible by means of using different frequencies for different vehicle occupants/different vehicle seats.

According to the first embodiment of the present invention, it is preferred that the distinction sensor is provided as a sensor using a signal transmission through a human body wherein preferably a first part of the distinction sensor is located permanently near the human body and wherein preferably the first part of the distinction sensor is a non-powered part. Furthermore, the problem is also solved with regard to a second embodiment of the present invention by an operation equipment for a vehicle comprising a control element, an actuator device and an electronic control unit, the operation equipment further comprising a distinction sensor for distinguishing the origin of a control action applied to the control element, wherein the distinction sensor is provided as a sensor using a signal transmission through a human body wherein preferably a first part of the distinction sensor is located permanently near the human body and wherein preferably the first part of the distinction sensor is a non-powered part. This provides the possibility to mount electrodes in the seats of vehicle occupants such that the interaction of one of the occupants with the control element can be easily detected and distinguished from the interaction of another of the occupants of the vehicle. One example of such a sensor is disclosed in German patent application DE 10 2005 015 802 A1. With such a sensor, it is possible to provide a cost effective solution to the problem of distinguishing the origin of a control action applied to a control element because the components of such a sensor or sensor system—namely the transmitting electrode and the receiving electrode—can be provided and integrated in a vehicle in a very cost efficient manner. With such a distinction sensor, a data transmission is realized through the human body of a vehicle occupant that operates the control element. It is known, that the human body can, in principle, be used as a medium to conduct electrical signals. Thereby and according to the present invention, a transmission route to transmit the localization information about the origin of a control action applied to a control element is established by means of either touching or only approaching (i.e. without having contact to the control element) for example a finger to the control element. This enables the possibility to distinguish e.g. between the driver/passenger as the origin of the control action. According to the present invention, it is furthermore advantageously possible that the transmitting electrode and/or the transmitting device is located inside the electronic control unit integrated or assigned to the seat of the vehicle occupant. For a large number of vehicles, especially vehicles of certain vehicle classes, the seats are already equipped with powered adjustment devices including electronic control units (e.g. for the adjustment of the seat and/or for the adjustment of parts of the seat and/or for a seat heating or seat cooling) so that the provision of the transmitting electrode and/or the transmitting device for the distinction sensor inside the seat or assigned to the seat does not substantially add further cost and weight to the seat or vehicle. The transmitting electrode can even be a part of a seat heating or can be integrated in the seat heating. In an alternative embodiment of the present invention (especially of the second embodiment of the present invention), it is possible to provide a first part of the distinction sensor, wherein the first part of the distinction sensor is located permanently (or at least permanently) near the human body and wherein preferably the first part of the distinction sensor is a non-powered part. This means that the first part of the distinction sensor is located for example in the vehicle seat on which the vehicle occupant is seated. Thereby, a permanent or almost permanent location near the vehicle occupant is possible. Other possible locations of the first part of the detection sensor include the steering wheel, the vehicle floor (near the feet of the vehicle occupant), the vehicle headliner (near the head of the vehicle occupant) and/or the headrest of the occupant. The provision of the first part of the distinction sensor as a non-powered part means that according to the present invention, there is no separate power supply necessary for the operation of this first part of the distinction sensor. This is especially advantageous if the seat (or another location of the first part of the distinction sensor) does not comprise or is not located near a power supply line that could be used. The first part of the distinction sensor especially also comprises a first electrode according to the sensor system mentioned above. This first electrode can be used both as a receiving electrode and as a transmitting electrode. A corresponding second electrode (of a second part of the distinction sensor) can be located (together with a power supply and further circuitry) at or near the control element, preferably at or near a display device and more preferably at or near an integrated display device and control element in the sense of a so-called touch screen. In such a situation, the second part (and correspondingly the second electrode) can be used as transmitting device or transmitting electrode for a (preferably modulated) signal received by the first electrode in the first part of the distinction sensor (and transmitted through the human body of the vehicle occupant). the reception of such a signal can be acknowledged by the first part of the distinction sensor by means of emitting a further (preferably also modulated) signal received in turn by the second part of the distinction sensor (and transmitted again through the human body of the vehicle occupant). Thereby, the information which one of the vehicle occupants have touched e.g. the touch screen or operated the control element can be distinguished. This example shows that in this case both the first electrode and the second electrode are used as an emitting (or transmitting) electrode and as a receiving electrode. In the case that a touch screen/touch panel is used, the electrode present in the touch panel or an electrode present in the touch panel can be used as the second electrode (of the second part of the distinction sensor). Thereby, there is no need for an additional electrode or corresponding part.

According to both the first and the second embodiment of the present invention, it is furthermore preferred that the origins distinguishable by the distinction sensor comprise at least the driver seat and the passenger seat. Thereby, it is advantageously possible to provide a vehicle occupant distinction such that the driver and the passenger (on the seat adjacent to the driver) can be distinguished. In another alternative of both the first and second embodiment of the present invention, it is also possible to provide the possibility to distinguish between different seats (i.e. the occupants seating on these seats) in a seat row behind the driver seat, whether it is the second row or the third or another subsequent row. In still a further alternative of both the first and second embodiment of the present invention, it is also possible to provide the possibility to distinguish between different seats (i.e. the occupants seating on these seats) of more than one seat row, for example the first row and the second row.

Furthermore and according to both the first and the second embodiment of the present invention it is very much preferred that the actuator device comprise at least one of the following vehicle systems: a vehicle control system, a vehicle navigation system, a vehicle video system, a vehicle audio system, a vehicle air conditioning system, a vehicle interior light system, a vehicle seat adjustment system. Thereby, it is advantageously possible according to the present invention that the inventive operation equipment for a vehicle can be used to operate almost every vehicle system with respect to functions that an occupant individually controls. In this respect, one important advantage of the present invention rely on the fact that it is possible to reduce the number of control elements mounted in the vehicle. For example, it is possible to adjust the left side air conditioning and the right side air conditioning (in a vehicle having the possibility of a different air conditioning for different sides or parts of the vehicle) by means of the same control element (because the origin of a control action applied to the control element can be detected by the distinction sensor). Thereby, a duplication of the control elements can be avoided. This leads to the possibility to safe costs and to save space—for example on the center console or at another location of the instrument panel. According to the present invention, this advantage is also possible in relation to controlling individual lighting devices or individual seat adjustment devices.

According to still a further alternative realization of the first and the second embodiment of the present invention it is very much preferred that the vehicle video system comprises at least one display device and/or that the control element is provided integrated with the at least one display device of the vehicle video system and/or of the vehicle navigation system and/or of another vehicle system. Thereby, it is advantageously possible according to the present invention that the control element can be used for a multitude of different functions, e.g. related to air conditioning, seat adjustment, audio/video entertainment, navigation tasks without the need to provide a multitude of different control element that make the vehicle not only more costly but also the operation of the control elements more complicated for a user.

Furthermore and according to both the first and the second embodiment of the present invention it is very much preferred that the control element comprises a capacitance sensor and/or that the distinction sensor comprises at least one optically sensing element and/or that the distinction sensor comprises a first optically sensing element and a second optically sensing element comprising a common field of view, the distinction of the origin of the control action applied to the control element being based on a superposition of signals of the first and the second optically sensing element (sensor data fusion). Such an embodiment of the present invention can also comprise a proximity sensor and/or an approximation sensor. By these measures, it is advantageously possible to provide a contactless operation of the control element such that the surface of the control element can be left free of dirt and or traces of fingerprints.

Another object of the present invention is a method for distinguishing the origin of a control action applied to a control element in an inventive operation equipment, wherein in a first step a first optically sensing element provides a first signal and a second optically sensing element provides a second signal, wherein in a second step the first signal and the second signal are superposed for distinguishing the origin of a control action. Thereby, a reliable and efficient distinction of the origin of a control action can be performed.

DRAWINGS

Embodiments of the present invention are represented in the drawing and are further detailed in the following description.

DETAILED DESCRIPTION

Figure 1:
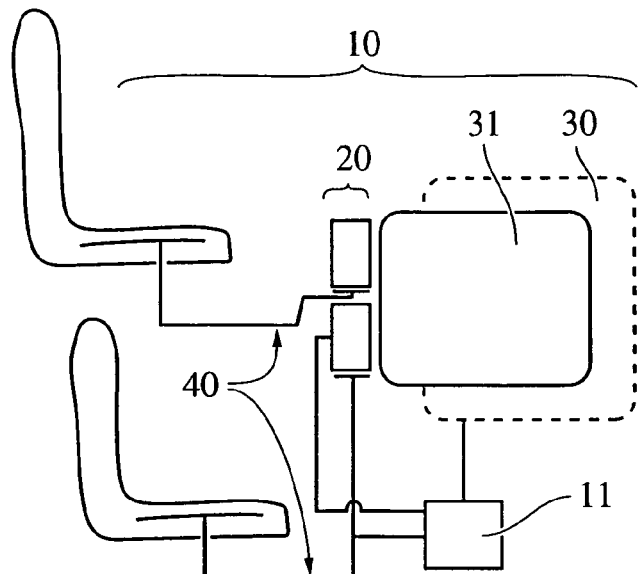
FIG. 1 shows a schematic view of the components of the operation equipment.

In FIG. 1, a schematic view of the components of the operation equipment 10 is shown. The operation equipment 10 comprises at least one control element 20, preferably a plurality of control elements 20. Furthermore, the operation equipment 10 comprises an actuator device 30 and an electronic control unit 11. The actuator device 30 can comprise a vehicle control system and/or a vehicle navigation system and/or a vehicle video system and/or a vehicle audio system and/or a vehicle air conditioning system and/or a vehicle interior light system and/or a vehicle seat adjustment system. The actuator device 30 comprises preferably a display device 31. Furthermore, the operation equipment 10 comprises a distinction sensor 40. The distinction sensor 40 is provided such that the origin of an operating action applied to the control element 20 or to one of a plurality of control elements 20 can be detected.

Figure 2:
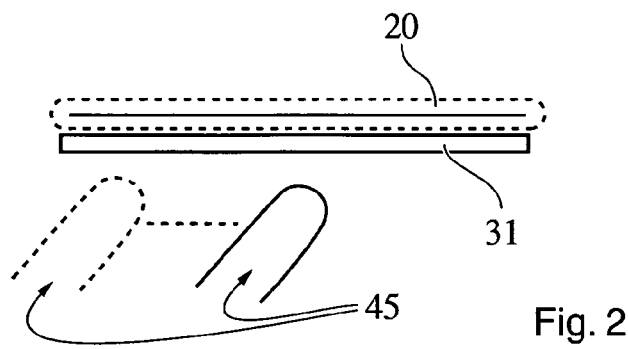
FIGS. 2 and 3 show different possibilities in distinguishing the origin of a control action.

In FIG. 2, a first possible arrangement of the distinction sensor 40 detecting the origin of a control action is schematically shown for the case that the display device 31 and the control element 20 are integrated or at least in proximity to each other. The control element 20 comprises for example electrodes (represented as continuous lines inside the dashed line representing the control element 20) of a capacitance sensor able to detect the approach of a finger 45 to the display device 31. By means of a plurality of such electrodes spatialized to different areas of the surface of the display device, it is possible to detect movements of the finger 45, as shown in dashed lines on the left hand side of FIG. 2.

Figure 3:
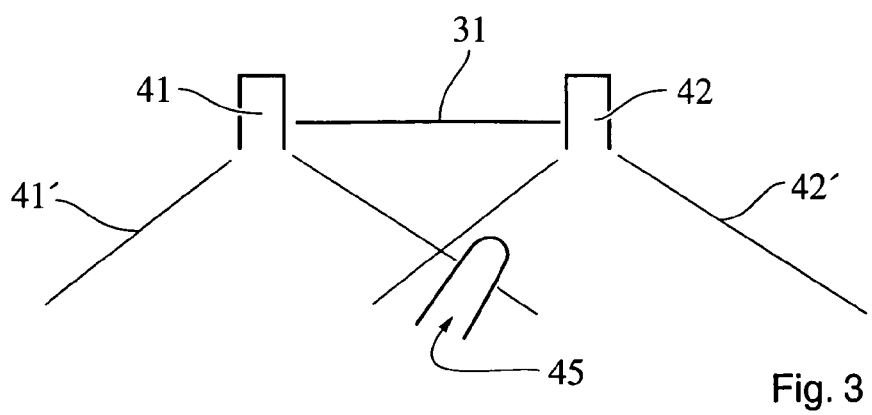

In FIG. 3, a second possible arrangement of the distinction sensor 40 detecting the origin of a control action is schematically shown. The distinction sensor 40 comprises a first optically sensing element 41 and a second optically sensing element 42. Both optically sensing elements 41, 42 provide a signal corresponding to e.g. an image of a respective detection area 41', 42'. By means of the optically sensing elements 41, 42, it is possible to detect the position and the direction of approach of a finger 45 of an occupant of the vehicle. Optionally, it is possible in this second arrangement of the distinction sensor 40 that capacitance approximation sensors and/or capacitance proximity sensors and/or PR-proximity sensors (passive infra red sensors) are used to further detect the presence and/or the movements of the finger 45 of a vehicle occupant. The data or signals of the different sensors can be processed in an integrated manner by the electronic control unit (sensor data fusion).

The invention claimed is:

1. Operation equipment for a vehicle comprising a control element, an actuator device, and an electronic control unit, the operation equipment further comprising a distinction sensor to distinguish an origin of a control action applied to the control element, wherein the control element is operated in a contactless manner via a sensor device configured to receive the control action, the distinction sensor is configured to send an electromagnetic signal through a human body from a first part of the distinction sensor to a second part of the distinction sensor, the first part of the distinction sensor is mounted to the vehicle remote from the control element and positioned to facilitate transmission of the electromagnetic signal to the human body, the second part of the distinction sensor is located at the control element and configured to receive the electromagnetic signal from the human body, the second part comprises the sensor device of the control element, the sensor device is located on a back side of a display device relative to a front screen side of the display device, and the sensor device is configured to receive the electromagnetic signal without contacting the human body;

wherein the first part of the distinction sensor comprises a first transmitter corresponding to a first seat within the vehicle and a second transmitter corresponding to a second seat within the vehicle, the first transmitter is configured to transmit the electromagnetic signal at a first frequency, the second transmitter is configured to transmit the electromagnetic signal at a second frequency, and the distinction sensor is configured to distinguish the origin of the control action based on whether the first frequency or the second frequency is received at the sensor device.

2. Operation equipment for a vehicle according to claim 1, wherein origins distinguishable by the distinction sensor comprise at least a driver seat and a passenger seat.

3. Operation equipment for a vehicle according to claim 1, wherein the actuator device comprises at least one of the following vehicle systems: a vehicle control system, a vehicle navigation system, a vehicle video system, a vehicle audio system, a vehicle air conditioning system, a vehicle interior light system, a vehicle seat adjustment system.

4. Operation equipment for a vehicle according to claim 1, wherein the control element is provided integrated with the display device.

5. Operation equipment for a vehicle according to claim 1, wherein the control element comprises a capacitance sensor.

6. Operation equipment for a vehicle comprising:
a control element configured to receive a control action from a first vehicle occupant and a second vehicle occupant, wherein the control element is configured to operate in a contactless manner via a sensor device of the control element;
a distinction sensor comprising a first part mounted to the vehicle remote from the control element and positioned to facilitate transmission of an electromagnetic signal at a first frequency to a first human body of the first vehicle occupant, and a second part mounted to the vehicle remote from the control element and positioned to facilitate transmission of the electromagnetic signal at a second frequency to a second human body of the second vehicle occupant; and
an electronic control unit communicatively coupled to the control element and to the distinction sensor, wherein the electronic control unit is configured to receive the electromagnetic signal at the sensor device of the control element from the first human body of the first vehicle occupant or from the second human body of the second vehicle occupant, the electronic control unit is configured to associate the control action with the first vehicle occupant if the electromagnetic signal is received at the first frequency, and to associate the control action with the second vehicle occupant if the electromagnetic signal is received at the second frequency, the sensor device is located on a back side of a display device relative to a front screen side of the display device, and the sensor device is configured to receive the electromagnetic signal without contacting the first or second human body.

7. The operation equipment of claim 6, wherein the first part is disposed within a driver seat, and the second part is disposed within a passenger seat.

8. A method comprising:
receiving an electromagnetic signal at a sensor device of a control element from a human body of a first vehicle occupant or a second vehicle occupant, wherein the sensor device of the control element is configured to receive a control action from the first vehicle occupant and the second vehicle occupant, the control element is configured to operate in a contactless manner via the sensor device, the sensor device is located on a back side of a display device relative to a front screen side of the display device, and the sensor device is configured to receive the electromagnetic signal without contacting the human body;
sending the electromagnetic signal to the human body via a first part of a distinction sensor mounted remote from the control element and positioned to facilitate transmission of the electromagnetic signal at a first frequency to the human body of the first vehicle occupant, and sending the electromagnetic signal to the human body via a second part of the distinction sensor mounted remote from the control element and positioned to facilitate transmission of the electromagnetic signal at a second frequency to the human body of the second vehicle occupant; and
associating the control action with the first vehicle occupant if the electromagnetic signal is received at the first frequency, and associating the control action with the second vehicle occupant if the electromagnetic signal is received at the second frequency.

* * * * *